Dec. 22, 1964   P. R. GJERTSEN   3,161,937
MOLD APPARATUS USED IN MAKING CERAMIC AND ABRASIVE PRODUCTS
Filed May 4, 1962   2 Sheets-Sheet 1
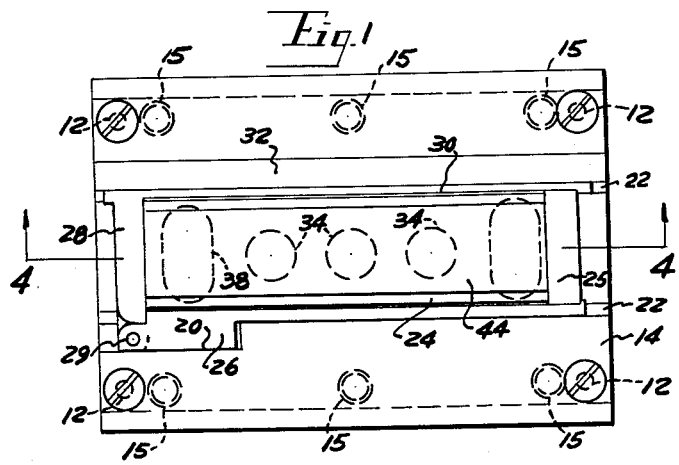
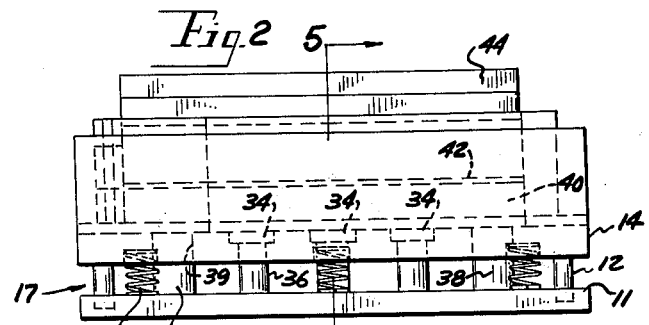
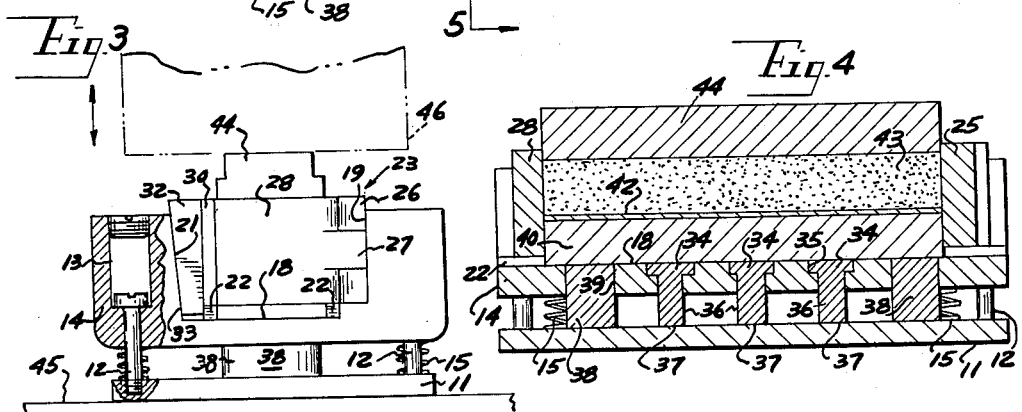
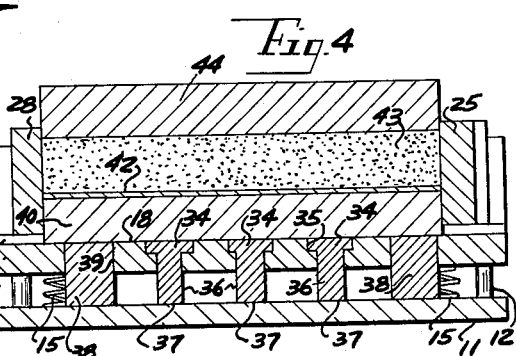
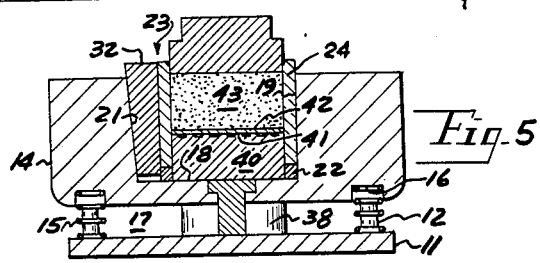
INVENTOR.
PAUL R. GJERTSEN
BY
ATTORNEY Dec. 22, 1964 P. R. GJERTSEN 3,161,937
MOLD APPARATUS USED IN MAKING CERAMIC AND ABRASIVE PRODUCTS
Filed May 4, 1962 2 Sheets—Sheet 2
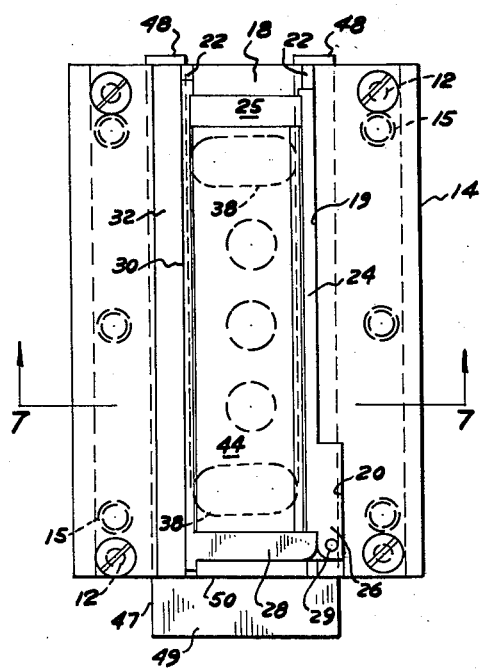
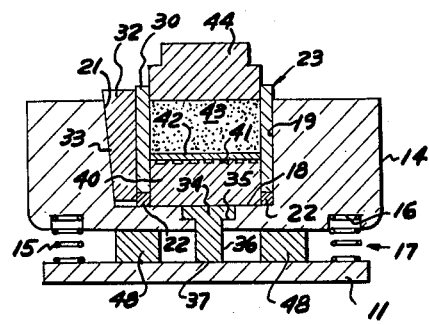
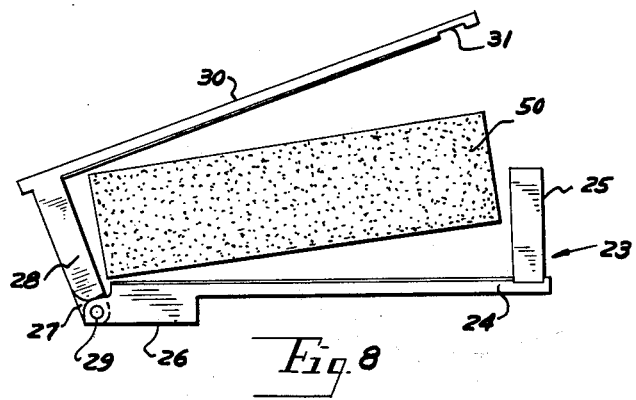
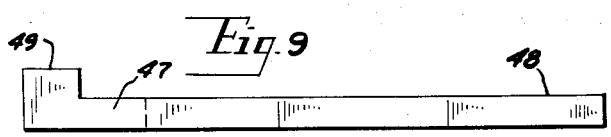
INVENTOR.
PAUL R. GJERTSEN
BY
Robert G. Sloman
ATTORNEY United States Patent Office 3,161,937
Patented Dec. 22, 1964

3,161,937
MOLD APPARATUS USED IN MAKING CERAMIC
AND ABRASIVE PRODUCTS
Paul R. Gjertsen, 9038 Dearborn Ave., Detroit, Mich.
Filed May 4, 1962, Ser. No. 192,556
2 Claims. (Cl. 25—119)

This invention relates to the apparatus for making ceramic and abrasive products, and more particularly to the apparatus for compacting a mix of ceramic or other materials in the manufacturing process of ceramic and abrasive products.

Heretofore, various methods have been employed in producing ceramic and abrasive products and wherein one of the initial steps is the proper compacting of the mixture of ingredients before applying the same to an oven for firing and vitrefying.

With methods heretofore employed, it has been found, particularly in the case of abrasive products as for example, honing stones, grinding wheels and the like, that there is a lack of uniform hardness over the various surface areas of the product. Efforts have heretofore been made to eliminate this objection and to provide an abrasive stone which will have a reasonable degree of uniformity of hardness throughout its surfaces.

The primary problem, apparently, is in the initial compacting of the abrasive mix of such ingredients as aluminum oxide, kaolin clay, silicon carbide, iron oxide and sodium oxide, and in suitably compressing the same in a mold mechanism to form an initial product which must thereafter be fired and vitrefied to produce the final product.

It is a further object of the present invention to provide an apparatus by which the mix which is employed in making the ceramic or abrasive product is compacted in such a way as to have after firing, a substantially uniform degree of hardness throughout its surface areas.

These and other objects will be seen from the following specification and claims in conjunction with the appended drawings in which:

FIG. 1 is a plan view of the present mold apparatus.

FIG. 2 is a side elevational view thereof.

FIG. 3, is an end elevational view thereof as positioned between the platens of a press which is fragmentarily or schematically shown.

FIG. 4 is a longitudinal section taken on line 4—4 of FIG. 1.

FIG. 5 is a transverse section taken on line 5—5 of FIG. 2.

FIG. 6 is a plan view of the mold apparatus with the supporting yoke interposed between the base and mold block.

FIG. 7 is a transverse section taken on line 7—7 of FIG. 6.

FIG. 8 is a plan view of the mold body, partly opened for the purpose of removing the compressed mix and prior to the firing operation.

FIG. 9 is a side elevational view of the yoke shown in FIGS. 6, and 7.

It will be understood that the above drawings illustrate merely a preferred embodiment of the invention, and that other embodiments are contemplated within the scope of the claims hereinafter set forth.

Referring to the drawings, the apparatus employed in the present process of making ceramic and abrasive products such as honing stones, grinding wheels, or grinding tools, or the like, includes an elongated rectangular base 11 adapted for mounting upon the fixed platen 45, of a conventional 20 to 50 ton press, being fragmentarily shown in FIG. 3. A hollow mold block 14, FIG. 5 is guidably and yieldably positioned above base 11, as indicated at 17, FIG. 7.

For this purpose there are employed a plurality of upright headed leader pins 12 at their lower ends threaded into base 11, with their heads movably positioned within corresponding apertures 13 in mold block 14, as best shown in FIG. 3. Coiled springs 15 are arranged in pairs between the base 11 and the undersurface of the mold block 14, with the upper ends of the springs anchored within corresponding apertures 16 in the said mold block, as best shown in FIG. 5.

The mold block 14 is hollow and includes the flat bottom 18, the upright interior side wall 19 and the upwardly and outwardly extending tapered opposing side wall 21, best shown in FIG. 3.

A pair of parallel spaced upright ridges 22 extend along bottom 18 and project upwardly therefrom, as best shown in FIG. 3, and are adapted to supportably mount the hollow mold body, generally indicated at 23, FIGS. 3 and 8.

The said mold body consists of pairs of right angular side plates 24–30 and connected respectively, the end plates 25–28. The end portion 26 of one of the side plates 24 is slotted to receive the transverse tongue 27 of end plate 28 which is pivotally connected thereto as at 29. The free interior wall portion of side plate 30 is notched at 31 to cooperatively receive the free end of end plate 25 to permit an interlocking relation when the hollow mold body which is open at its top and bottom is arranged in assembled position, as best shown in FIGS. 1 and 6.

As viewed in FIGS. 1, 6 and 8, the pivot end portion of side plate 24 is enlarged as at 26 and when nested within the bottom of the mold block 14 is received within the cutaway slotted portion 20, best shown in FIG. 6.

The hollow mold body 23 is positioned within the mold block 14 and fixedly secured therein. For this purpose there is employed an elongated wedge 32, whose outer surface 33 is tapered upwardly and outwardly for cooperative wedging engagement with the corresponding tapered surface 21, forming one of the interior side walls of the mold block 14, best shown in FIG. 7.

A reaction means movably extends through the bottom of mold block 14 and is interposed between base 11 and the undersurface of the elongated molding platform 40. As best shown in FIGS. 4 and 7 a mold platform 40 is provided of rectangular shape so as to snugly, yet movably position within the lower open end of the mold body 23, and so as to lie between the upright supporting ridges 22, FIG. 7, upon which the mold body is supportably mounted.

The above described reaction means are in the nature of a series of upright posts 34 and 38 which movably extend through the bottom of the mold block 14 and supportably bear as at points 37 against the top surface of base 11.

In the illustrative embodiment of the invention the said posts are arranged in longitudinally spaced relation along the undersurface of the platform 40. Some of the posts as at 34, FIG. 4, have enlarged heads, which are nested within counterbores within the bottom 18 of the mold body, and are thus retained against relative longitudinal movement in one direction, but are free on the other hand for transmitting reaction forces to the undersurface of the platform 40 when applied to the press, schematically shown at 45–46 in FIG. 3.

The said counterbore above referred to for retaining the said posts elements 34 are designated at 35, FIG. 7.

A pair of end posts 38 are also provided which project through corresponding apertures 39 in the bottom of the mold block 14 and are interposed between the undersurface of the said mold block and the top surface of base 11, for the purpose hereinafter described, primarily for transmitting of the reaction pressure to the undersurface of platform 40, when the compressive forces are applied by the press 45–46, FIG. 3.

In the illustrative embodiment of the invention, the top surface of the platform 40 has formed therein a series of elongated parallel ridges 41 with corresponding grooves therebetween, over which an elongated support plate 42 is mounted, and for the purpose of supporting within the mold body 23 the mix of ingredients, generally indicated at 43, which are employed for the compressing operation.

In the illustrative embodiment of the invention wherein the abrasive body to be constructed may be for honing stones or grinding wheels, a mix may consist of a finely divided mixture of aluminum oxide, kaolin, or clay, sand, iron oxide, and a suitable flux, such as sodium oxide. The finely divided mix, usually in a dry form is poured into the open mold 23 until it fills a certain portion of the cavity therein, as shown in FIG. 7, after which an elongated rectangularly shaped pressure plate 44 is applied. This pressure plate is snugly and movably positioned within the upper open end of the hollow mold and bears cooperatively down upon the mix of ingredients shown at 43, FIG. 7.

At this point the assembled mold is positioned within a suitable high-pressure press and wherein the base 11 rests upon the platen 45 which is fixed, and wherein the movable platen 46 of the press, fragmentarily shown at FIG. 3 is adapted for operative downward pressure upon the top surface of the pressure plate 44.

Various pressures can be employed, however, depending upon the desired hardness of the finished abrasive or ceramic article after it has been fired and vitrefied. It has been found that the greater the initial pressures employed are, the harder will be the stones, or other objects after vitrefication. For example, the pressures applied may be in the range from 1 to 10,000 pounds per square inch, for illustration, but not by limitation, as it is conceivable that other pressures may be employed depending upon the nature and characteristics desired, as will be hereunder pointed out.

As above described, it has been pointed out that the mold block 14 is movably and yieldably mounted upon the base 11 by virtue of the leader pins 12 and the associated or related parallel spaced coiled springs 15. For a portion of the mixed compression operation, as hereunder described in connection with the process of manufacture, it is desirable that there be a yielding spaced relation between the mold block 14 and the base 11.

However, it is contemplated, furthermore, as an additional part of the process that there be a reapplication of pressure for further compacting the mix 43. However, before this is done, a means are employed for establishing a non-yielding relation between the mold block 14 and the base 11. For this purpose, there is employed a generally U-shaped yoke 47, best shown in FIGS. 6, 7 and 8, whose elongated parallel spaced free ends 48 are adapted to be longitudinally projected into the space 17 between the mold block 14 and the base 11 to thus establish a rigid relationship as distinguished from yielding.

After this has been done, and wherein it is noted that the yoke 47 includes the upright stop 49, FIGS. 6 and 8, for limiting inward movement thereof, a secondary, but normally increased pressure is applied through the press 45–46, and operating through the pressure plate 44 to complete the compacting operation.

As a part of the present invention, in the initial process for making or compacting a mix, used for example in the manufacture of stones, the yoke 47–48 was omitted. It was found, however, that with the yoke omitted that a lack of uniformity resulted most of the time between the top and bottom surfaces of the compacted article after it was fired and vitrefied.

Apparently due to the relative fluidity of the homogeneous mix of material, it became apparent that in the initial process of applying pressure through the press to the pressure plate 44, that additional frictional pressures were achieved between the mix itself and the mold body due to the fact that the pressure applied by this press was transmitted in all directions through the fluid type of mixture 43, or which at least had some of the characteristics of fluid to the extent that pressure was transmitted uniformly in all directions.

Apparently this frictional force with respect to the interior side walls of the mold body had something to do with the fact that in the operation employing a single compressive force and without using the yoke, that there was a lack of uniformity between the hardness upon the opposing faces of the finished article, shown at 50, FIG. 8. However, it is contemplated that the FIG. 8 merely shows the opening of mold 23 for the purpose of carefully removing the compacted mix for the next step, namely the projection thereof into a firing or vitrefying furnace, to complete the operation.

The present invention, therefore, contemplates the means which achieves a uniformity of hardness of the surfaces of the abrasive article and which incorporates a portion of the present process. Primarily, in the present process without the yoke 47–48 employed, and after the mix 43 was introduced and the pressure plate 44 applied, an initial pressure is applied to the pressure plate 44 in the press for an initial compacting operation.

For illustration, the pressure employed may be a pressure of approximately 2000 pounds per square inch. After the initial compressing operation, the movable platen 46 in temporarily withdrawn and the yoke 47–48 introduced as shown in FIG. 7, after which the press is again activated, but now increased pressure of approximately 4000 pounds per square inch is applied to the pressure plate 44, completing the compacted article.

As a further step in the process, the compacted article indicated at 50 in FIG. 8 is removed from the mold which is separated as shown by the hinge action 29 and the said compacted article is introduced into an oven, such as a ceramic oven, or an electric oven, and in a normal atmosphere.

A temperature of approximately 2150 to 2350 degrees F., is maintained for a period which may range between 10 and 23 hours. In the illustrative embodiment of the invention, the firing period took 23 hours, after which the oven was cooled at the rate of 100 degrees per hour and opened when the temperature reached approximately 1200 degrees for further cooling.

Also in the heating up operation of the oven, and as illustrative of the present process, compacted article 50 is introduced into the oven at a temperature of approximately 300 degrees F. Thereafter the temperature of the oven is increased 100 degrees per hour until the above identified range of 2100 to 2300 degrees F. is reached. It is contemplated, of course, that the temperatures, as well as the times may be varied, depending upon the particular or peculiar characteristics desired in the molded, vitrefied and fired article.

In the operation of the present process, it has been found that where the initial pressure employed was approximately 2000 pounds per square inch, with the yoke 48 omitted, and thereafter with the re-application of pressure of approximately double, as for example 4000 pounds per square inch, and with the yoke employed, that the hardness of the stone throughout its surface areas, was substantially constant. In the illustrative embodiment, the stone had a hardness number of approximately 26–27, for illustration.

By the same token, as further illustration of the advantages of the present method and apparatus, when the pressure is applied before and after the yoke was introduced, were substantially the same, a non-uniform stone was produced. In experimenting with the present apparatus, when the yoke was left in at all times and a uniform pressure was applied at 4000 pounds per square inch, a non-uniform stone was produced.

Likewise when the yoke was not used at all, non-uniform stones were produced.

As illustrative of what may be expected in the present process, here set out below pressures applied initially and secondarily with the yoke applied, and opposite thereof, hardness achieved in the end product, it being noted that the hardness factors are numbers which indicate the higher the number, the softer the stone.

| Initial Pressure | Secondary Pressure | Hardness Factor |
|---|---|---|
| 2,000 | 4,000 | 55 |
| 3,000 | 6,000 | 45 |
| 4,000 | 8,000 | 35 |
| 5,000 | 10,000 | 25 |

The conclusion to be drawn is that uniform abrasive stones may be produced and wherein it is noted that the secondary pressure applied is substantially double the initial pressure and with surface hardness or hardness of the vitrefied article increasing proportionately to the amount of pressures applied thereto in the initial compacting operation.

For illustration, in carrying out the present process and as one example, the initial compacting operation with the yoke 48 omitted, and an initial pressure of 2000 pounds per inch applied and thereafter the yoke used, and a subsequent pressure of 4000 pounds per square inch applied, it was found that the top and bottom of the finished article had substantial uniform hardness.

It may well be that one explanation may lie in the fact that the increased secondary pressure, and with the use of the yoke does something to equalize the wall friction between the mix and the mold body during the compressing operation. In any event, it has been found that the compacting should be done in two stages; the first stage being with the reduced pressure and with the yielding relationship between the mold block and the base, and in the second stage a non-yielding relation between the mold block and base, and with increased pressure.

As another example of the use of the present process, the apparatus was employed, using the yoke 48 initially, and applying an initial pressure in the press of approximately 2000 pounds per square inch. Thereafter, with the yoke omitted, pressure was re-applied at a pressure of approximately 4000 pounds per square inch, and the resulting product still achieved a substantially uniform hardness characteristic throughout its surface portions.

It has been found, however, that with the yoke used first in the initial application of the lower pressure that the bottom surface of the compacted article in its finished form will not always or necessarily be the hardest, though it can be anticipated that one side of the molded article will be harder than the other after firing.

It has been found, however, in connection with the present apparatus and process that an improved and substantially hard product is produced when the process is carried out so that with the initial and lower pressure, the yoke is omitted followed by a reapplication of a double or increased pressure with the yoke employed.

Having described my invention, reference should now be had to the following claims.

I claim:

1. A mold apparatus for compacting a mix used in making ceramic and abrasive products comprising a base adapted for mounting upon the fixed platen of a press, a hollow mold block guidably and yieldably positioned above said base for movement relatively thereto, a hollow mold body open at its top and bottom mounted upon and within the mold block and secured therein, a mold platform snugly, but movably positioned within the bottom of the mold body resting upon said block, reaction means movably extending through the bottom of the block and interposed between said platform and base fixedly supporting said platform, said mold body and platform adapted to receive a mix of ingredients to be compressed, a pressure plate snugly and movably extending into the top of the mold body bearing against said mix, said pressure plate adapted for registry with the movable platen of said press for exerting a uniform predetermined pressure upon the mix for compacting the same, and an elongated flattened spacer yoke snugly and removably interposed between the top of said base and the undersurface of said block after the initial application of pressure and for the purpose of permitting a secondary application of pressure and maintaining a non-yielding relation between said block and base, the guided and yieldable positioning of the mold block including upright leader pins anchored in said base and received within corresponding apertures in said block, and coiled springs interposed in compression between said base and block, said reaction means consisting of a series of longitudinally spaced posts extending throughout the length of said platform, some of said posts retained against relative movement in one direction with respect to said block.

2. A mold apparatus for compacting a mix used in making ceramic and abrasive products comprising a base adapted for mounting upon the fixed platen of a press, a hollow mold block guidably and yieldably positioned above said base for movement relatively thereto, a hollow mold body open at its top and bottom mounted upon and within the mold block and secured therein, a mold platform snugly, but movably positioned within the bottom of the mold body resting upon said block, reaction means movably extending through the bottom of the block and interposed between said platform and base fixedly supporting said platform, said mold body and platform adapted to receive a mix of ingredients to be compressed, a pressure plate snugly and movably extending into the top of the mold body bearing against said mix, said pressure plate adapted for registry with the movable platen of said press for exerting a uniform predetermined pressure upon the mix for compacting the same, and an elongated flattened spacer yoke snugly and removably interposed between the top of said base and the undersurface of said block after the initial application of pressure and for the purpose of permitting a secondary application of pressure and maintaining a non-yielding relation between said block and base, said mold body including pairs of upright right angular end and side plates, means hingedly interconnecting the end of one side plate of one pair with the end plate of the other pair of plates, the free end of the other end plate being interlocked with the free end of the other side plate.

References Cited by the Examiner

UNITED STATES PATENTS

| 1,041,540 | 10/12 | White | 25—119 |
| 1,090,566 | 3/14 | Prosser | 25—119 |
| 1,679,408 | 8/28 | Davis et al. | 18—6.5 |
| 2,204,151 | 6/40 | Rodefer et al. | 18—42 |
| 2,253,003 | 8/41 | Whipple | 18—59.6 |
| 2,562,876 | 8/51 | Baeza | 18—6.5 |
| 2,747,231 | 5/56 | Reinhardt | 18—59.3 |
| 2,778,064 | 1/57 | Clark | 18—59.3 |
| 2,882,556 | 4/59 | Hall | 18—6.5 |
| 2,913,766 | 11/59 | Haller. | |

OTHER REFERENCES

Engelmann, German printed application K175881Vc/80a, Dec. 22, 1955.

Germany, K175881Vx/80a, Mar. 28, 1953.

R. F. WHITE, *Primary Examiner.*

WILLIAM J. STEPHENSON, *Examiner.*